April 28, 1925.
M. A. MARQUETTE
METHOD OF MAKING TIRE BEADS
Filed Dec. 23, 1920
1,535,429
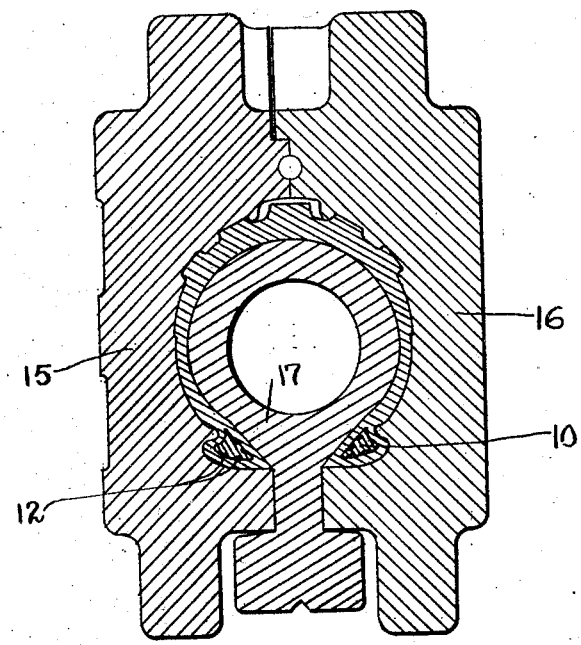
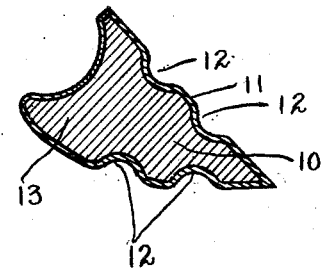
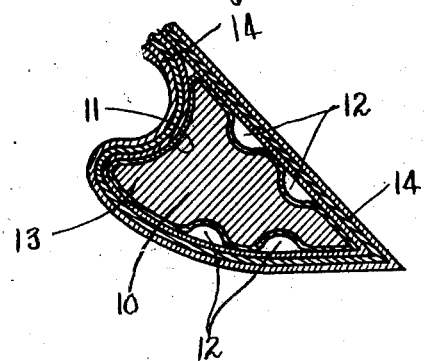
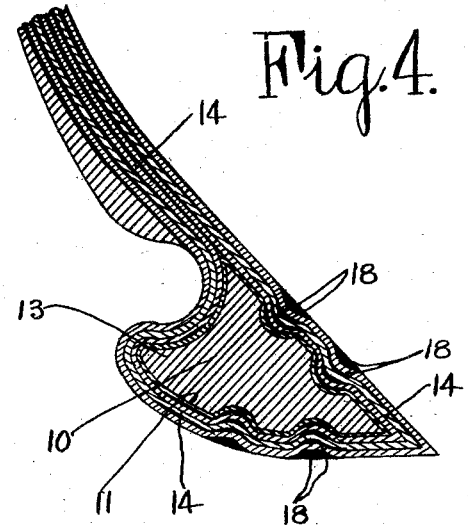
INVENTOR
Melvon A. Marquette
BY
Edward C. Taylor
ATTORNEY Patented Apr. 28, 1925.

1,535,429

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING TIRE BEADS.

Application filed December 23, 1920. Serial No. 432,723.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in a Method of Making Tire Beads, of which the following is a specification.

This invention relates to the manufacture of rubber articles, especially casings for pneumatic tires, and particularly to the construction of the bead portions thereof. While the invention is applicable to bead constructions of various types it is of particular advantage as applied to clincher beads, and will be described with particular reference thereto.

In clincher bead construction it is desirable to have the bead as hard as possible consistently with the requisite elasticity of the bead necessary for stretching it over the rim upon which the tire is to be used. With this limitation as to elasticity a hard bead will function better than a soft one. It is customary to give the fabric or cord built into the carcass of a tire a sufficient coating of rubber to attain so far as possible a rubber insulation between the laminations of the carcass and the separate cords of each lamination. This is particularly important in the side walls and across the tread in order to prevent the working of cord against cord. At the bead, however, it is important to have the material hardened, for a hard bead will best hold its proper position on the rim. The rubber coated fabric or cords composing the side walls are continued around the bead for anchorage. Because of this fact the bead edge is not as hard as desired and in the attempt to make it hard it has been customary to provide for rigid mold pressure against the bead during vulcanization. This pressure, however, does not give all the desired results because the rubber resists the pressure and remains in the bead when finished.

The object of this invention is to increase the hardness of the bead by so forming the bead filler that provision will be made for extruding a portion of the rubber from the rubber coated fabric or cord of which the carcass of the tire casing is made at the point where this fabric passes around the bead filler. To this end the invention consists in the improvements in the construction of the elements of the casing and the methods of building and vulcanizing which will now be described with particular reference to the accompanying drawings, in which Fig. 1 is a section of a mold with a tire casing mounted therein preparatory to vulcanization;

Fig. 2 is a section on an enlarged scale of a bead filler used in the practice of my invention;

Fig. 3 is a section showing such a filler incorporated into the tire casing, prior to vulcanization; and Fig. 4 is a similar section showing the condition of the casing after vulcanization.

In carrying out my present invention I form the bead filler 10 which, as in usual constructions, is made of a rubber compound harder than that with which the body of the casing is constructed, and which is covered with a fabric 11. In distinction from the usual type of filler I shape the one used in my improved process so that it will have indentations 12. It will be understood that the bead filler is in the form of an annulus, and these indentations are preferably annular grooves, though they may be made in other shapes, such as a plurality of local depressions, if desired. These indentations are preferably located in that portion of the bead remote from the heel 13 as it is the heel of the bead which comes in working contact with the rim and which it is desired to harden by providing space elsewhere to which excess rubber my flow.

The bead filler so constructed is built into the casing in the usual manner, the plies of rubberized fabric 14 surrounding the bead and extending into the body of the casing. The condition of the bead when first built into the carcass is shown in Fig. 3.

The tire casing, completed by the addition of suitable side walls and tread, is then placed within an annular mold comprising sections 15 and 16, and is usually supported by an annular core 17, usually the core upon which the casing is built. The casing is now subjected to the heat and pressure necessary to complete the vulcanization. The effect of the pressure on the beads will be to cause the rubber coating between the plies of fabric around the filler to flow into the indentations 12, substantially as indicated by the shaded areas 18 in Fig. 4. The removal of rubber from the plies of fabric by this means has the effect of hardening the fabric layers in the bead, particularly around the heel 13 of the bead.

Having thus described my invention, I claim:

The method of making the bead edges of clincher tire casings, consisting in incorporating between the rubberized fabric plies at the bead edge a filler provided with indentations only at points remote from the heel of the bead adapted to receive extruded rubber, the heel portion of the bead being left smooth, and vulcanizing the bead edge under heat and pressure whereby a portion of the rubber is extruded from the fabric, thereby making the heel of the bead harder than the remainder.

MELVON A. MARQUETTE.